(12) United States Patent
Hou

(10) Patent No.: US 9,302,559 B2
(45) Date of Patent: Apr. 5, 2016

(54) INDEPENDENT SUSPENSION SYSTEM WITH SELF-COMPENSATED FLOATING SWING ARM

(71) Applicant: He Hou, Hebei (CN)

(72) Inventor: He Hou, Hebei (CN)

(73) Assignee: He Hou, Hebei (CN)

( * ) Notice: Subject to any disclaimer, the term of this patent is extended or adjusted under 35 U.S.C. 154(b) by 0 days.

(21) Appl. No.: 14/084,120

(22) Filed: Nov. 19, 2013

(65) Prior Publication Data
US 2014/0131971 A1    May 15, 2014

Related U.S. Application Data

(63) Continuation of application No. PCT/CN2012/075703, filed on May 18, 2012.

(30) Foreign Application Priority Data

May 19, 2011 (CN) .......................... 2011 1 0130336

(51) Int. Cl.
| | |
|---|---|
| *B60G 3/10* | (2006.01) |
| *B60G 3/26* | (2006.01) |
| *B60G 7/02* | (2006.01) |
| *B60G 7/00* | (2006.01) |

(52) U.S. Cl.
CPC .. *B60G 3/10* (2013.01); *B60G 3/26* (2013.01); *B60G 7/001* (2013.01); *B60G 7/02* (2013.01); *B60G 2200/46* (2013.01); *B60G 2204/143* (2013.01); *B60G 2204/42* (2013.01)

(58) Field of Classification Search
CPC ............ B60G 7/001; B60G 7/02; B60G 3/10; B60G 3/26; B60G 21/05; B60G 7/00; B60G 2200/142; B60G 2204/42; B60G 2204/143

USPC ..................... 280/124.128, 124.134, 124.146
See application file for complete search history.

(56) References Cited

U.S. PATENT DOCUMENTS

| | | | |
|---|---|---|---|
| 2,767,998 A | | 10/1956 | Powell |
| 3,612,503 A | * | 10/1971 | Tanno ........................... 267/188 |

(Continued)

FOREIGN PATENT DOCUMENTS

| | | |
|---|---|---|
| CN | 1253886 A | 5/2000 |
| CN | 1919627 A | 2/2007 |

(Continued)

OTHER PUBLICATIONS

State Intellectual Property Office of the People's Republic of China, First Notice of the Opinion on Examination in Chinese Patent Application No. 201110130336.6 (Dec. 20, 2012).

(Continued)

*Primary Examiner* — James English
(74) *Attorney, Agent, or Firm* — Leydig, Voit & Mayer, Ltd.

(57) ABSTRACT

An independent suspension system with self-compensated floating swing arm is provided. The independent suspension system with self-compensated floating swing arm includes at least one of an independent suspension apparatus with self-compensated floating swing arm for controlling wheels of a vehicle to perform linear motion constantly along vertical direction of car body of the vehicle, and a scissors-type anti-skew bar apparatus controlled by centrifugal force for balancing skew force when the vehicle is cornering. The two mechanisms can be used together or independently. Also, they may be applicable for front wheels or rear wheels.

15 Claims, 15 Drawing Sheets

(56) References Cited

U.S. PATENT DOCUMENTS

| | | | |
|---|---|---|---|
| 4,415,178 A * | 11/1983 | Hatsushi et al. | 280/124.145 |
| 4,955,634 A | 9/1990 | Smith | |
| 5,560,637 A * | 10/1996 | Lee | 280/5.521 |
| 6,267,387 B1 * | 7/2001 | Weiss | 280/5.52 |
| 6,352,272 B1 * | 3/2002 | Lee | 280/124.134 |
| 6,676,145 B2 * | 1/2004 | Carlstedt et al. | 280/124.146 |
| 2001/0035623 A1 * | 11/2001 | Wagner | 280/124.128 |
| 2014/0131971 A1 | 5/2014 | Hou | |

FOREIGN PATENT DOCUMENTS

| | | | |
|---|---|---|---|
| CN | 101117089 A | | 2/2008 |
| CN | 101544172 A | * | 9/2009 |
| CN | 201494269 U | | 6/2010 |
| CN | 102363408 A | | 2/2012 |
| WO | 2012/155857 A1 | | 11/2012 |

OTHER PUBLICATIONS

State Intellectual Property Office of the People's Republic of China, First Notice of the Opinion on Examination in Chinese Patent Application No. 2011.10130336.6 (Sep. 22, 2013).

State Intellectual Property Office of the People's Republic of China, International Search Report in International Patent Application No. PCT/CN2012/075703, (Aug. 9, 2012).

* cited by examiner dependent suspension independent suspension independent suspension

INDEPENDENT SUSPENSION SYSTEM WITH SELF-COMPENSATED FLOATING SWING ARM

CROSS-REFERENCES TO RELATED APPLICATIONS

This application is a continuation in part of International Patent Application No. PCT/CN2012/075703, filed on May 18, 2012, which claims priority to Chinese patent application No. 201110130336.6, filed on May 19, 2011, the contents of which are incorporated herein by reference in their entireties.

TECHNICAL FIELD

The present invention relates to vehicle chassis technology, and more particularly, to an independent suspension system with self-compensated floating swing arm.

BACKGROUND

By making reference to various documents, such as U.S. Pat. No. 4,955,634 A, <Automobile Technology>, <Automobile Construction> and <Explanation of Merits and Demerits Regarding Various Forms of Suspension> (taken from www.liuzhou.bitauto.com dated Aug. 16, 2008) and comparing with the traditional technology, an existing vehicle suspension system is generally classified into dependent and independent suspension systems, and is equipped with an anti-skew bar apparatus to reduce vehicle skew when cornering.

As shown in FIG. 1, a dependent suspension system has a structure characterized in that: wheels at two sides are connected by one-piece frame, and the wheels together with the frame suspend underneath the car body through a resilient suspension system. The dependent suspension system has various advantages, such as simple structure, low cost, high strength and easy maintenance. However, both the comfort and stability of driving of the dependent suspension system are poor. When a wheel at one side hops, a wheel at the other side may also hop and the wheels skew, which may reduce the contact area with the road, aggravate tire wear, and decrease tire adhesion on the ground. Moreover, the dependent suspension system is not suitable for front suspension.

As shown in FIGS. 2 and 3, in an independent suspension system, wheels on each side are independently suspended underneath the vehicle frame or car body through a resilient suspension system. The independent suspension system has various advantages, such as light weight, reduced impact to the car body, increased adhesion of the wheels to the road. By using the independent suspension system, a soft spring with a low stiffness coefficient can be adopted to improve the comfort of automobile. The position of the engine can be lowered in order to lower the center of gravity of the automobile, so as to improve the vehicle's driving stability. Each of the left and right wheels hop independently and there is no interference therebetween, thus the inclination and shake of the car body can be reduced. However, the independent suspension system may have a complicated structure, high cost, and inconvenience on maintenance.

As described above, due to the inherent structural limit of the existing dependent and independent suspension systems, the wheels cannot keep perpendicular to the road surface, and wheel track, wheelbase and positioning parameters cannot keep unchanged during the movement of the vehicle. Since all the existing suspension solutions are based on axial movement, even if the most complicated suspension can only make variations of wheel track, wheelbase and positioning parameters of front wheels within acceptable ranges. That is, compromise may be made among various parameters that restraint and contradict with each other, and the perfect performance for suspension can't be achieved. It can be seen that all the existing suspension solutions are based on a way of rotating around an axle, and an anti-skew bar may connect wheels at two sides for sacrificing the performance of independent suspension in exchange of a limited anti-skew function. A perfect suspending apparatus can't be produced to approach an ideal driving, stability, comfort and safety of the vehicle if the above mentioned way is not abandoned.

SUMMARY

In order to improve the performance of an existing suspension system, an independent suspension system with self-compensated floating swing arm may be provided.

In an example, an independent suspension system with self-compensated floating swing arm includes: at least one of an independent suspension apparatus with self-compensated floating swing arm and a skew force balancing apparatus; wherein the independent suspension apparatus with self-compensated floating swing arm is to control wheels of a vehicle to perform linear motion constantly along vertical direction of car body of the vehicle; and wherein the skew force balancing apparatus is to balance skew force when the vehicle is cornering.

In an example, a linear motion mechanism includes: a compensator and a floating swing arm; wherein the compensator comprises: a bracket connected to a mounting point of a mechanical device requiring linear motion; and wherein a middle slideway is arranged in one of the bracket of the compensator and the floating swing arm, and a limiting shaft within the middle slideway is arranged in the other one of the bracket of the compensator and the floating swing arm; wherein a limiting slideway is arranged in one of the bracket of the compensator and the floating swing arm, and a rear shaft within the limiting slideway is arranged in the other one of the bracket of the compensator and the floating swing arm.

According to the present invention, a way of rotating around an axle and a way of connecting wheels at two sides via an anti-skew bar adopted in a traditional suspension may be abandoned. In an example of the present invention, a floating swing arm cooperates with a compensator and a locator in a suspension portion, and a skew force balancing apparatus is employed in an anti-skew portion. As such, an independent suspension system with self-compensated floating swing arm is provided. The independent suspension system with self-compensated floating swing arm may include two mechanisms, i.e., an independent suspension apparatus with self-compensated floating swing arm and a skew force balancing apparatus. The two mechanisms can be used together or independently. Also, they may be applicable for front wheels or rear wheels. In this way, the wheels may always hop in a straight line along a vertical direction of the car body on various roads and in various states of the vehicle including such as a low speed state, a high speed state, or a turning state, to maximize the contact area between the wheels and the road. The wheels may perform linear motion perpendicular to the car body under the control of the independent suspension apparatus with self-compensated floating swing arm, such that the motion trace of the wheels is independent of the jump of the wheels and is always perpendicular to the car body. Thus, no matter what road conditions are met, the contact area between the wheels and the road is maximized and there is a large adhesion force therebetween, and the wheel track and wheelbase always remain constant (the variations of wheel track and wheelbase are completely compensated by a compensator, and the left, right, front and rear wheels may have a constant distance of vertical projection on the road). In other words, the hop of the wheels may have no effect on the stability of the car body. Since the wheels go straight in the vertical direction, various parameters for suspension such as kingpin inclination angle, wheel before beam and wheel camber keep the same as original setting parameters in a variety of operating conditions, which may form a basis on optimal adjustment for parameters. The two mechanisms can be used together or independently, and are applicable for both front wheels and rear wheels. In this way, the wheels may make a linear jump constantly along the vertical direction of the car body on various roads, and in various states under low speed or high speed or during turning of the vehicle. Meanwhile, the skew force balancing apparatus engages automatically when the vehicle is turning, and balances the skew force by an equal but opposite force. Such a simple construction can carry out a complex task of active suspension, and ultimately improve the anti-skew ability and provide better driving, security, stability and comfort capabilities for the vehicle. Moreover, the abrasion for the wheels may be reduced and the fuel may be saved.

DETAILED DESCRIPTION

Figure 1:
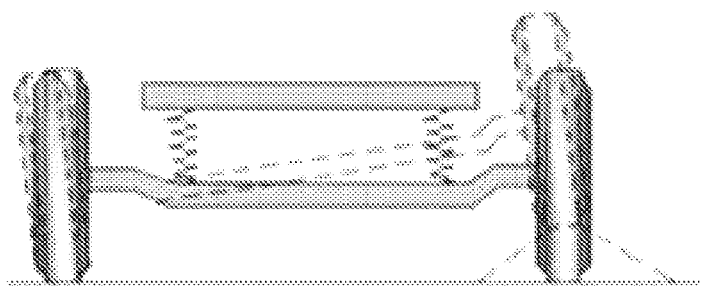
FIG. 1 is a schematic diagram illustrating an existing dependent suspension system.
Figure 2:
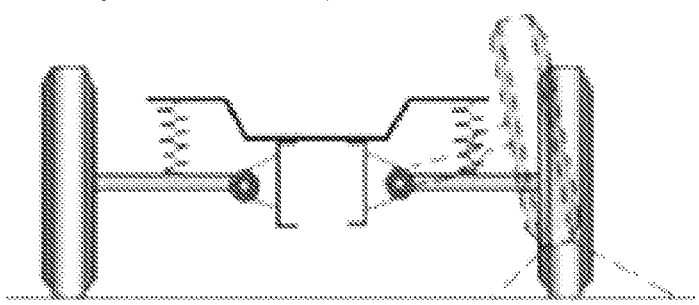
FIG. 2 is a schematic diagram illustrating an existing independent suspension system.
Figure 3:
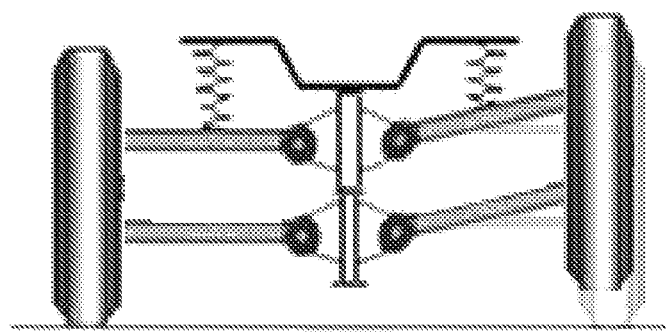
FIG. 3 is a schematic diagram illustrating another existing independent suspension system.

In order to make the purpose, technical solutions and advantages of the present invention clearer, the technical solutions of the present invention may be described in detail by reference to the embodiments and following drawings.

The technical solution of the present invention includes two mechanisms: an independent suspension apparatus with self-compensated floating swing arm, and a skew force balancing apparatus. In an example, the independent suspension apparatus with self-compensated floating swing arm is to control wheels to perform linear motion perpendicular to the car body. The skew force balancing apparatus is to balance the skew force when the vehicle is cornering. In an example, the skew force balancing apparatus may not work when the vehicle goes straight. In an example, the skew force balancing apparatus may be a scissors-type anti-skew bar apparatus controlled by centrifugal force, or a hydraulic skew force balancing apparatus. The two mechanisms may be used together or individually. Also, the two mechanisms may either be applicable for front wheels, or applicable for rear wheels. Specifically, the two mechanisms may be described separately hereinafter.

In an example, the independent suspension apparatus with self-compensated floating swing arm may include a compensator 400, a floating swing arm 405, a steering knuckle 410, a locator 411 and a spring 412, which may be assembled in various forms.

Figure 4:
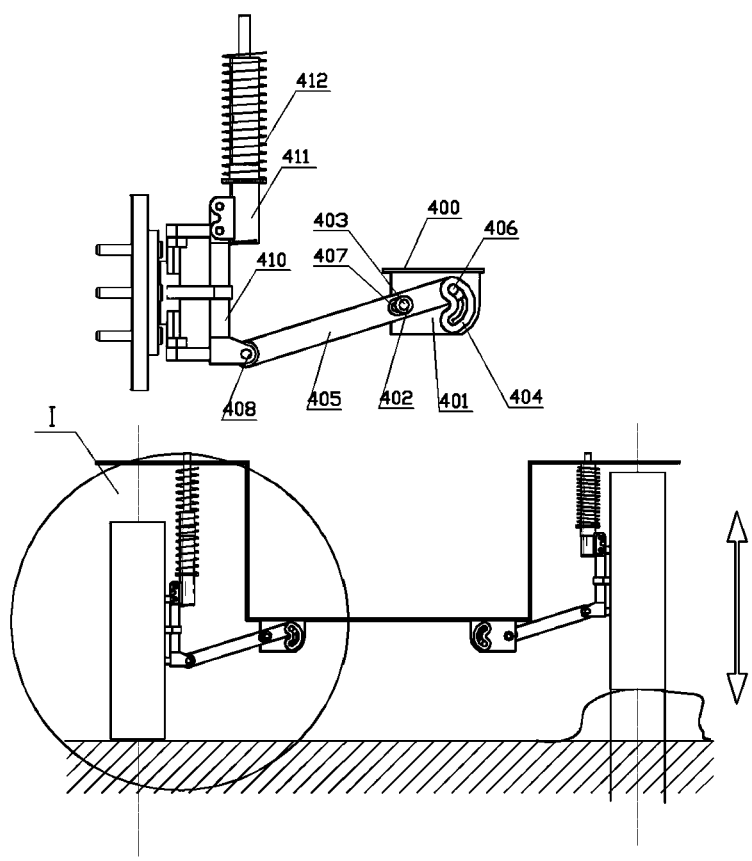
FIG. 4 is a schematic diagram illustrating a basic-type independent suspension apparatus with self-compensated floating swing arm according to an embodiment of the present invention.

FIG. 4 is a schematic diagram illustrating the structure of a basic-type independent suspension apparatus with self-compensated floating swing arm according to an embodiment of the present invention. Theoretically, the deviation for compensation precision of the independent suspension apparatus is zero. As shown in FIG. 4, the compensator 400 is to limit degree of freedom of the floating swing arm 405 and provide compensation for motion deviation. In an example, the compensator 400 includes an II-type bracket 401. The bracket 401 is connected to a mounting point via a rubber sheath, and there is a limiting hole 402, a limiting shaft 403 and a limiting slideway 404 on the bracket 401. In an example, the compensator 400 may restrict motion posture of the floating swing arm 405. Due to the restriction by the compensator 400, points on the floating swing arm 405 perform a compound movement within the motion plane. A rear shaft 406 may slide and rotate within the limiting slideway 404. A middle slideway 407 may slide and rotate around the limiting shaft 403. A front hole 408 is articulated to the steering knuckle 410 and is further fixedly connected to a shock absorber 411 via the steering knuckle 410. The central portion of the front hole 408 moves vertically along an extension line of the axis of the shock absorber 411 or along a line in parallel with the axis of the shock absorber 411. The shock absorber 411 mounted perpendicular to the car body, of which the lower end is bolted with the steering knuckle 410, may also play a role of locator. In an example, the extension line of the axis of the shock absorber 411 falls on the central portion of the front hole 408, or is in parallel with the motion line of the central portion of the front hole 408.

It is required that a valve stem of the shock absorber 411 may have sufficient strength, and an existing shock absorber satisfying the requirement may be used. A spring for absorbing shock 412 may be nested around the shock absorber 411, or may be mounted on the steering knuckle 410, so as to reduce moments applied to the shock absorber 411, the floating swing arm 405 and the compensator 400.

The portion between the front hole 408 of the floating swing arm 405 and the middle slideway 407 may be bent to adapt the construction of the car body. However, the axes of the rear shaft 406, the middle slideway 407 and the front hole 408 may be on the same line so as to simplify the design.

The shafts 403 and 406 in slideways of the compensator 400 and the floating swing arm 405 may be provided with a bushing or bearing to elongate lifetime. The portions for sliding and rotating may be lubricated and sealed.

The deviation of the motion line for the central portion of the front hole 408 of the flowing swing arm 405 is controlled by the limiting slideway 404 of the compensator 400. The central line of the limiting slideway 404 may be a compensating curve, and the precision of the compensating curve directly determines the deviation of the motion line of the wheels, therefore the precision may be increased as far as possible. The precision can be between 0.01 mm and 0.03 mm using common manufacturing technologies, which has been improved thousands of times comparing with a swing deviation of 20 mm for the vehicle wheels, and then can be neglected.

The motion process of the independent suspension apparatus with self-compensated floating swing arm as shown in FIG. 4 is described as follows. When the wheels fall across a protrusion on the road, the wheels rise together with the steering knuckle 410, thereby raising the front end of the floating swing arm 405. Due to the longitudinal restriction by the limiting shaft 403 of the compensator 400, the floating swing arm 405 is forced to rotate around the limiting shaft 403. At the same time, due to the transverse restriction by the limiting slideway 404 of the compensator 400, the rear shaft 406 of the floating swing arm 405 has to slide and rotate within a slideway, and the middle slideway 407 of the floating swing arm 405 is forced to transversely slide around the limiting shaft 403. The curve of the limiting slideway 404 can compensate for the motion deviation of the frond end of the floating swing arm 405, so as to ensure the perpendicular linear motion of the front end of the floating swing arm 405. In a like manner, when the position of the wheels is lowered, the front end of the floating swing arm 405 may likewise perform a linear motion.

Figure 17:
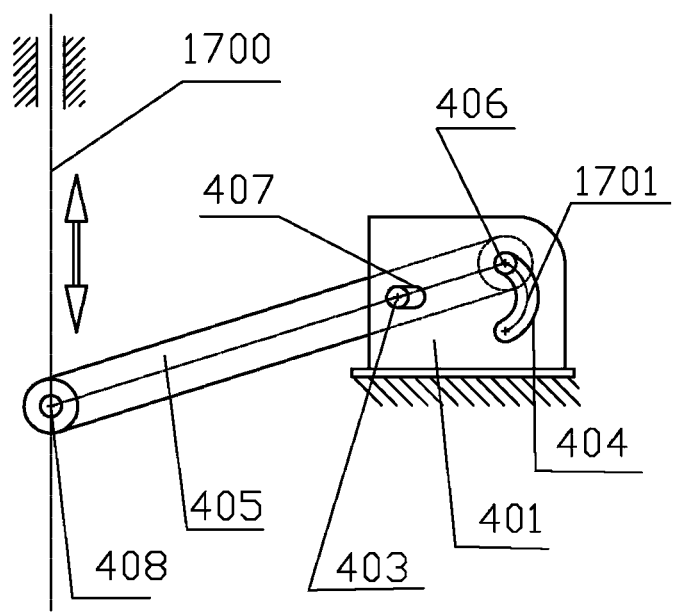
FIG. 17 is a schematic diagram illustrating a linear motion mechanism according to an embodiment of the present invention.

In an example, the compensator 400 and the floating swing arm 405, which are a part of the independent suspension system with self-compensated floating swing arm in FIG. 4, may be separated out as a linear motion mechanism (shown in FIG. 17) to control the linear motion independently. Specifically, the linear motion mechanism illustrated in FIG. 17 may include a compensator and a floating swing arm. The compensator includes: a bracket connected to a mounting point of a mechanical device requiring linear motion. In an example, a middle slideway is arranged in one of the bracket of the compensator and the floating swing arm, and a limiting shaft within the middle slideway is arranged in the other one of the bracket of the compensator and the floating swing arm. In an example, a limiting slideway is arranged in one of the bracket of the compensator and the floating swing arm, and a rear shaft within the limiting slideway is arranged in the other one of the bracket of the compensator and the floating swing arm. In an example, the floating swing arm may include a front hole, and the central of the front hole, an axis of the rear shaft and an axis of the limiting shaft are on the same line. In an example, a central line 1701 of the limiting slideway is a compensation curve 1701 for controlling deviation of a motion line 1700 of the central of the front hole in cooperation with the middle slideway. In an example, the middle slideway is to limit degree of freedom in a vertical direction of the floating swing arm, and the limiting slideway is to limit degree of freedom in a horizontal direction.

Figure 5:
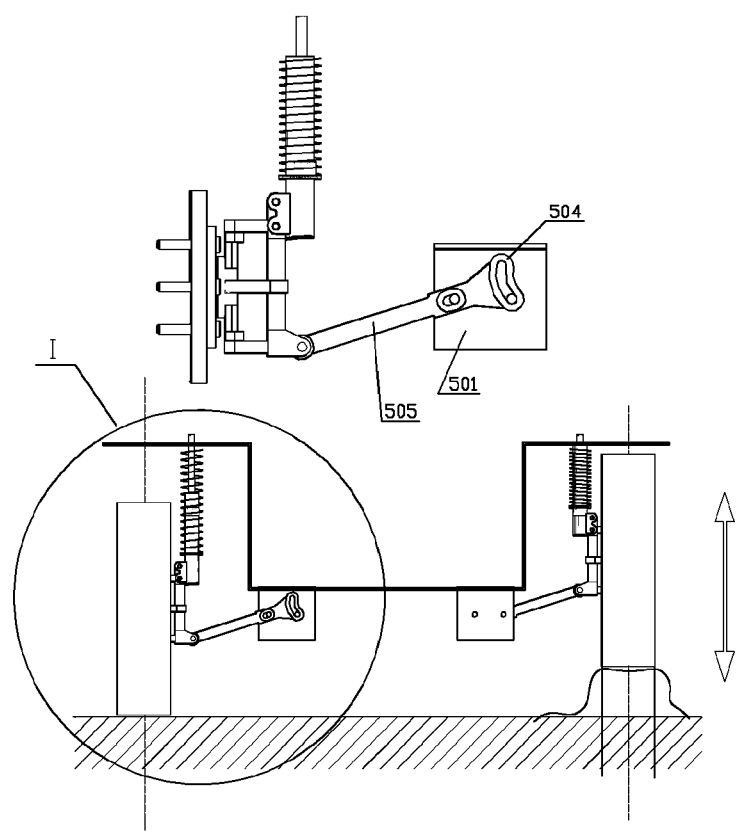
FIG. 5 is a schematic diagram illustrating a variation of an independent suspension apparatus with self-compensated floating swing arm according to an embodiment of the present invention, wherein Y-type swing arms are employed and two slideways are located on the swing arms.

FIG. 5 is a schematic diagram illustrating a variation structure of an independent suspension apparatus with self-compensated floating swing arm according to an embodiment of the present invention. As shown in FIG. 5, in the variation structure, a slideway 504 is arranged on a floating swing arm 505, and the slideway 504 may be changed to an opposite direction compared with the basic structure and needs corresponding redesign. Other parts are the same as the basic structure. The compensation precision for deviation is still zero theoretically so as to reduce manufacturing costs, while the volume of a bracket 501 is increased somewhat.

Figure 6:
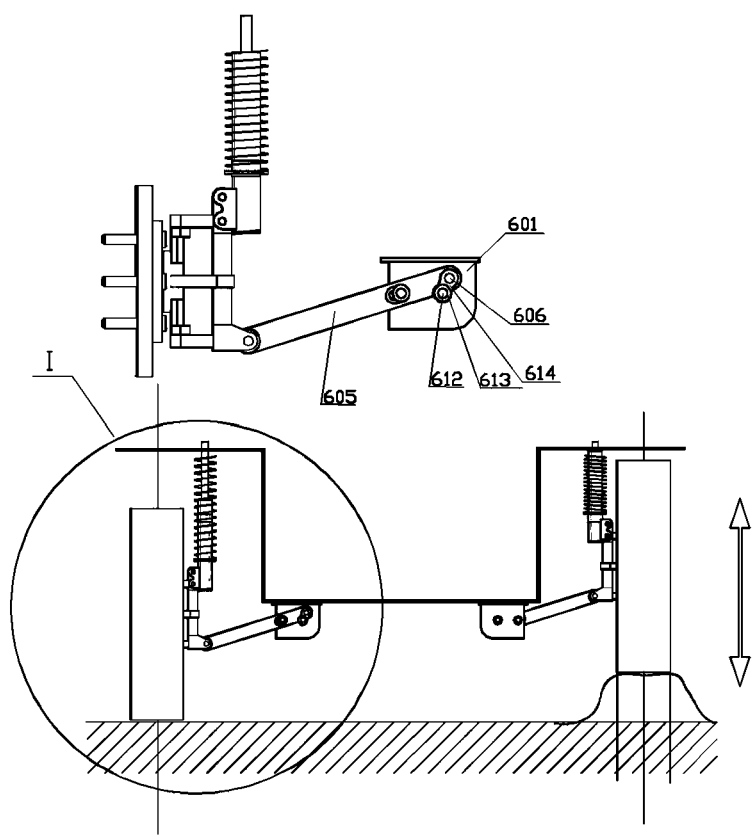
FIG. 6 is a schematic diagram illustrating a variation of an independent suspension apparatus with self-compensated floating swing arm according to another embodiment of the present invention, wherein a crank-type swing arms are employed and compensating slideways are not required.

FIG. 6 is a schematic diagram illustrating a variation structure of an independent suspension apparatus with self-compensated floating swing arm according to another embodiment of the present invention. In such variation structure, a crank-type swing arm is employed instead of that shown in FIG. 4. However, the variation structure may not have a better compensation precision, and the deviation of the motion line is approximately within 0.2 mm. The structure may be as follows: no slideway is arranged on a bracket 601, and a positioning shaft 612, a positioning hole 613 and a crank 614 are added to form a crank eccentric mechanism together with a rear shaft 606 and a floating swing arm 605. The crank eccentric mechanism may facilitate manufacturing and reduce cost, which is also a practical choice.

Figure 7:
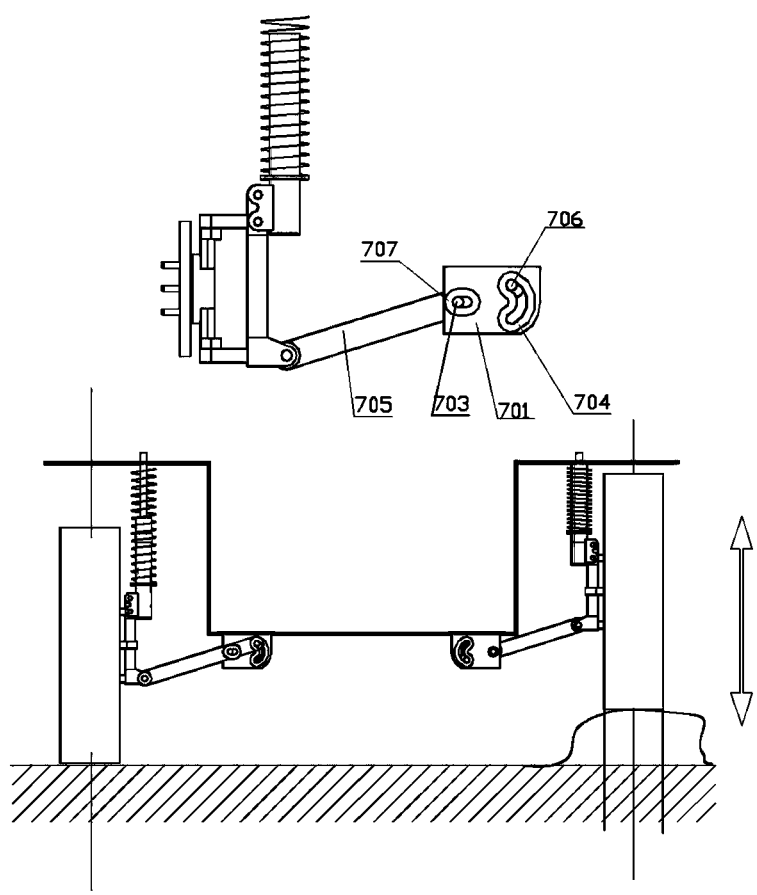
FIG. 7 is a schematic diagram illustrating a variation of an independent suspension apparatus with self-compensated floating swing arm according to another embodiment of the present invention, wherein two slideways are located on a bracket.

FIG. 7 is a schematic diagram illustrating a variation structure of an independent suspension apparatus with self-compensated floating swing arm according to another embodiment of the present invention. The basic structure shown in FIG. 4 may be changed to get the variation structure shown in FIG. 7. In FIG. 7, two slideways 704 and 707 are located on a bracket 701, and shafts 703 and 706 are arranged on a floating swing arm 705. The length of the middle slideway 707 is increased, and the volume of the bracket 701 remains constant.

Figure 8:
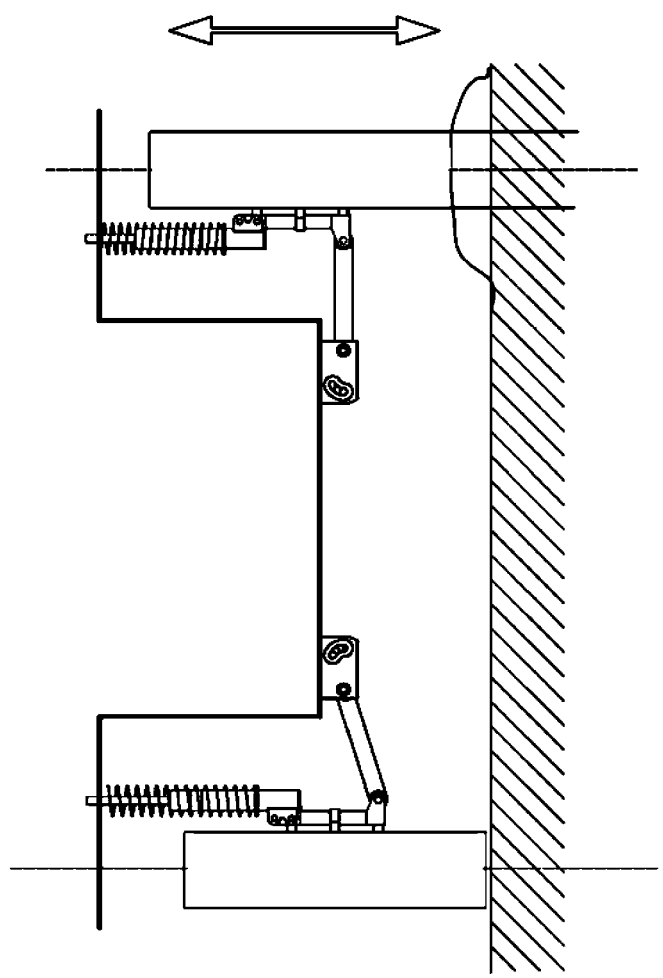
FIG. 8 is a schematic diagram illustrating an independent suspension apparatus with self-compensated floating swing arm according to another embodiment of the present invention, wherein the compensating curve deflects towards one side or shortens in a corresponding direction.

As shown in FIG. 8, if the travel actually required for suspension is relatively small, the compensation curve may deflect towards one side or shorten in a corresponding direction. In such a case, the volume of the bracket may be substantially reduced. Various forms and flexible combination thereof may be obtained, so as to adapt to the layout requirement of the car body.

Figure 9:
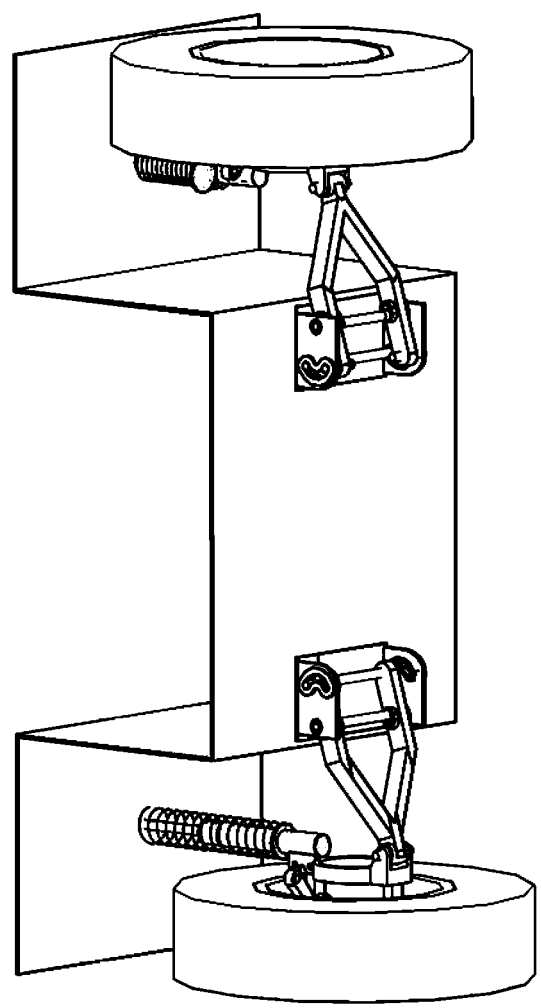
FIG. 9 is a diagram showing a state in which a basic-type independent suspension apparatus with self-compensated floating swing arm is transverse according to another embodiment of the present invention, wherein an A-type arm is employed.

For example, FIG. 9 is a diagram showing a state in which an independent suspension apparatus with self-compensated floating swing arm having a basic structure is transverse according to another embodiment of the present invention. In an example, the basic structure includes: a floating swing arm 405, a compensating mechanism 400, a steering knuckle 410 and a shock absorber 411 for positioning. The basic structure is simple and has fundamental performance able to meet real requirements. In addition, in order to ensure the braking performance, the floating swing arm may be widened or be designed in a form of A-type to increase strength.

Figure 10:
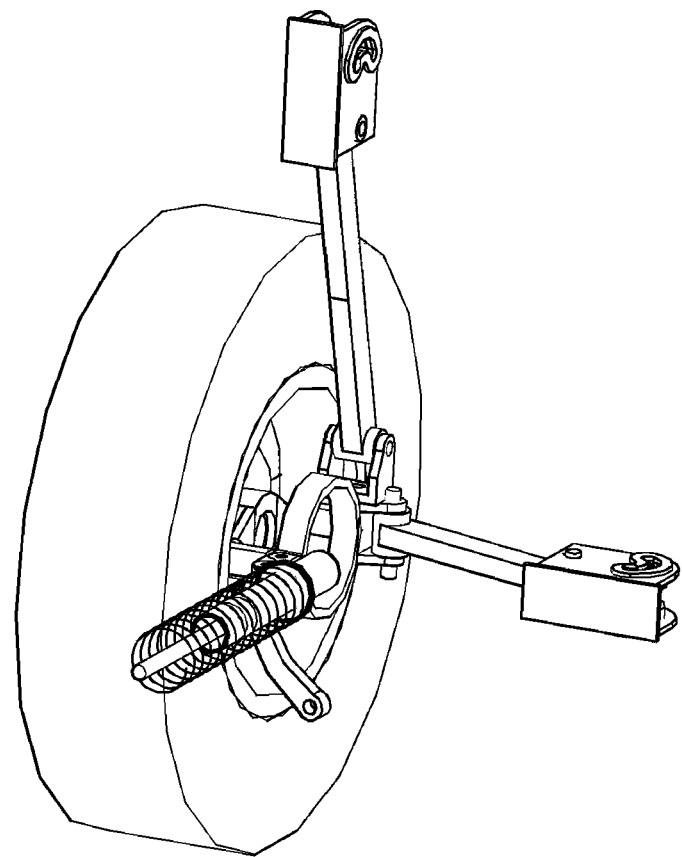
FIG. 10 is a schematic diagram illustrating independent suspension apparatuses with self-compensated floating swing arm according to an embodiment of the present invention, wherein the swing arms are perpendicularly arranged at 90 degrees with each other in these two apparatuses.

FIG. 10 is a schematic diagram illustrating an independent suspension apparatus with self-compensated floating swing arm which may be commonly used according to an embodiment of the present invention. As shown in FIG. 10, two sets of swing arms of apparatuses have an angle of 90 degrees with each other. Such construction is simple and adapted to undergo force. The swing arm 405 and the compensator 400 which are placed longitudinally may receive pull force when braking occurs or when wheels come across obstacles, and therefore, they may be slim so as to reduce weight.

Figure 11:
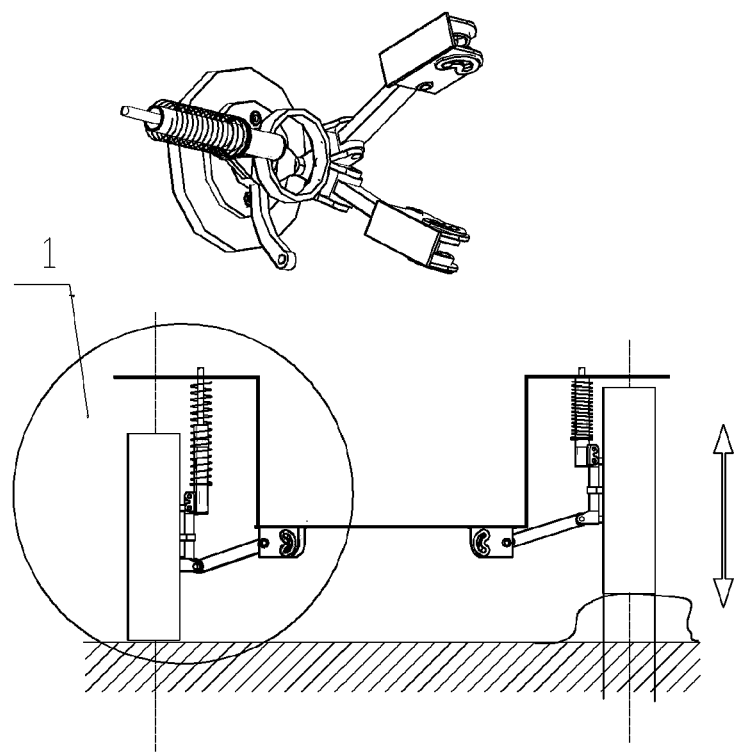
FIG. 11 is a schematic diagram illustrating independent suspension apparatuses with self-compensated floating swing arm according to an embodiment of the present invention, wherein the swing arms in these two apparatuses are arranged in a random direction.

FIG. 11 is a schematic diagram illustrating an independent suspension apparatus with self-compensated floating swing arm according to an embodiment of the present invention. Similar to a basic structure, two sets of swing arms in the apparatus as shown in FIG. 11 are arranged in a random direction within a plane perpendicular to the car body. In addition, an oblique mounting technique may be used, that is, the floating swing arm, the compensating mechanism, the steering knuckle and the shock absorber for positioning are obliquely mounted at the same angle, so as to adapt the car body construction. However, wheelbase may vary during movement, and the oblique angle cannot be too large. In an example, the shock absorber, the compensator, the floating swing arm, and the steering knuckle are mounted perpendicular to the car body. In another example, the shock absorber is mounted on the car body with a little incline relative to the front or rear direction of the car body at the same angle as the compensator, the floating swing arm and the steering knuckle. Meanwhile, other mechanical mechanisms may use the apparatus as shown in FIG. 11, and dispense with cumbersome guide rails.

Generally, various existing methods may be used to adjust parameters described in embodiments or examples of the present invention without affecting suspension performance.

Figure 12:
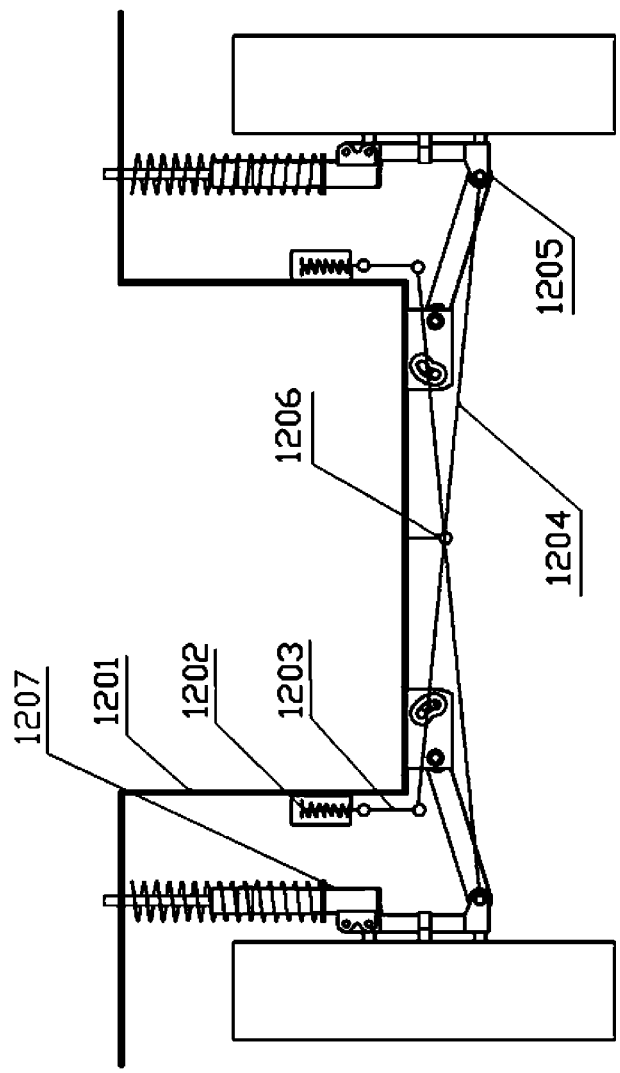
FIG. 12 is a diagram of a scissors-type anti-skew bar apparatus controlled by centrifugal force according to an embodiment of the present invention.

FIG. 12 is a schematic diagram illustrating a scissors-type anti-skew bar apparatus controlled by centrifugal force according to an embodiment of the present invention. The scissors-type anti-skew bar apparatus controlled by centrifugal force mainly includes a centrifugal force controlling axial clutch 1202, a connecting rod 1203, and a lever 1204. The anti-skew bar apparatus is connected to a suspension bracket 1205 of the car body 1201.

Figure 13:
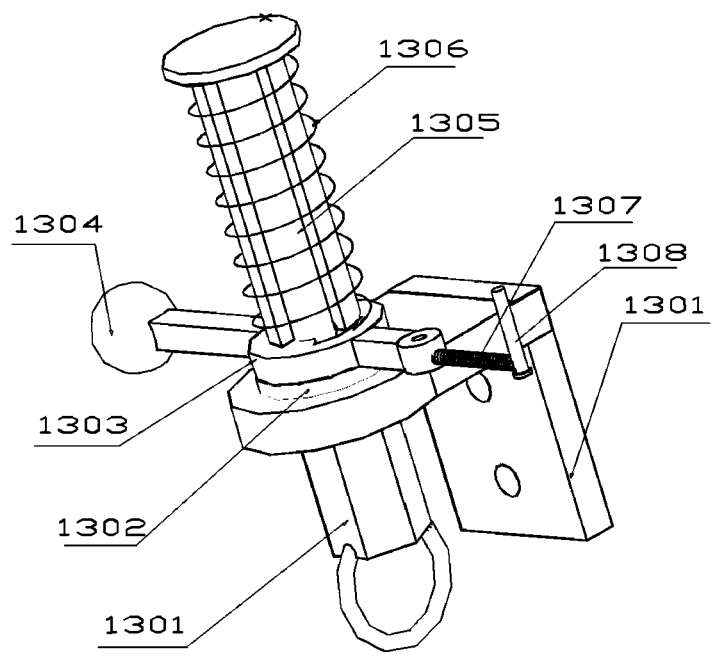
FIG. 13 is an enlarged view of a centrifugal force controlling axial clutch according to an embodiment of the present invention.

As shown in FIGS. 12 and 13, the centrifugal force controlling axial clutch 1202 may include the following components. A mounting bracket 1301 is fixedly mounted onto the car body 1201. A thrust bearing 1302 is arranged on the mounting bracket 1301. A swing rod 1303 with a weight hammer 1304 is arranged on the thrust bearing 1302. In an example, a spline shaft 1305 may be inserted into the swing rod 1303, the thrust bearing 1302 and the mounting bracket 1301. The spline shaft 1305 engages with a spline hole of the swing rod 1303. A spring 1306 is arranged around the spline shaft 1305. A tension spring 1307 is connected to the swing rod 1303 and a positioning pin 1308 to perform positioning when there is no centrifugal force and to reposition the swing rod and absorb shock when the centrifugal force disappears.

When the swing rod 1303 with the weight hammer 1304 deflects, the spline shaft 1305 and the spline hole of the swing rod 1303 may misalign, and then the spline shaft 1305 is locked by the swing rod 1303. When the swing rod 1303 resets, the spline shaft is aligned with the spline hole of the swing rod to make the spline shaft slidable. In an example, when the weight hammer deflects, the structure is in a lock state; when the weight hammer resets, it is in an unlock state.

The pull force of the tension spring 1307, the dimension of the weight hammer 1304 and the length of the swing rod 1303 may be appropriate. The swing rod 1303 may turn flexibly to ensure that an axial clutch is involved or detached at the right time when the vehicle is turning.

In an example, the lever 1204 may be made of rigid or elastic metal materials. One end of the lever 1204 is articulated to a wheel bracket 1205 at one side, or to a component moved in synchronization with a wheel such as a shock absorber 1207 at a lower end of the shock absorber. A central part of the lever 1204 is arranged on a bracket 1206 at a central portion of the car body 1201, and is able to make a small amount of sliding. The other end of the lever 1204 is articulated to one end of a connecting rod 1203 at the other side of the car body 1201. The other end of the connecting rod 1203 is articulated to the centrifugal force controlling axial clutch 1202 mounted on the other side of the car body 1201. The above components are crossed and disposed symmetrically in pairs in a scissors-type form. Two levers 1204 crossing with each other form two opposite angles having the bracket 1206 at the central portion of the car body 1201 as a vertex (the two opposite angles are equal). When the distance between a wheel at one side and the car body varies due to the skew force, the distance between a wheel at the other side and the car body also varies synchronously and at the same amount, thereby achieving self-balance. Both front wheels and rear wheels have a pair of levers, or the pair of levers may only be mounted in the front wheels or in the rear wheels. In practice, the shape, dimension and strength of the lever 1204 may be determined depending on other indicators such as the shape, spatial distribution, and size of force of the car body, so as to achieve an optimal effect.

In an example, the scissors-type anti-skew bar apparatus controlled by centrifugal force shown in FIG. 12 or 13 may be operated as follows. When a vehicle moves straightly, a swing rod 1303 with a weight hammer may not swing, and the centrifugal force controlling axial clutch 1202 is not involved. Then, the centrifugal force controlling axial clutch 1202 is elastically connected to the lever 1204. Driven by the wheel bracket 1205 or the shock absorber 1207, the lever 1204 may make empty jumps around a central pivot 1206 of the car body, and wheel jumps are independent of the car body.

When the vehicle turns left, the skew force directs right, so as to lower the car body at right side and raise the car body at left side. The weight hammers of the swing rods at two sides of the car body deflect due to the centrifugal force, and the clutch mechanism is engaged to rigidly connect wheels at right side to the car body at left side via a lever (a rubber sheath may be provided to absorb shock). The car body at left side lowers and wheels at left side are jacked via a lever to raise the car body at right side. That is, a skew force directing one side changes its direction and is transferred to the opposite side via a lever's pivot. The anti-skew force increases or decreases as the skew force increases or decreases, thus a balanced skew is obtained by making the anti-skew force and the skew force equal to each other and in opposite directions. In this way, the car body may also be lowered automatically. Similarly, when the vehicle turns right, a process corresponding to the above mentioned process may appear which has exactly the same function. As can be seen, a simple principle, i.e., opposite angles are equal and a force and its counterforce are also equal, is employed in the apparatus.

Figure 14:
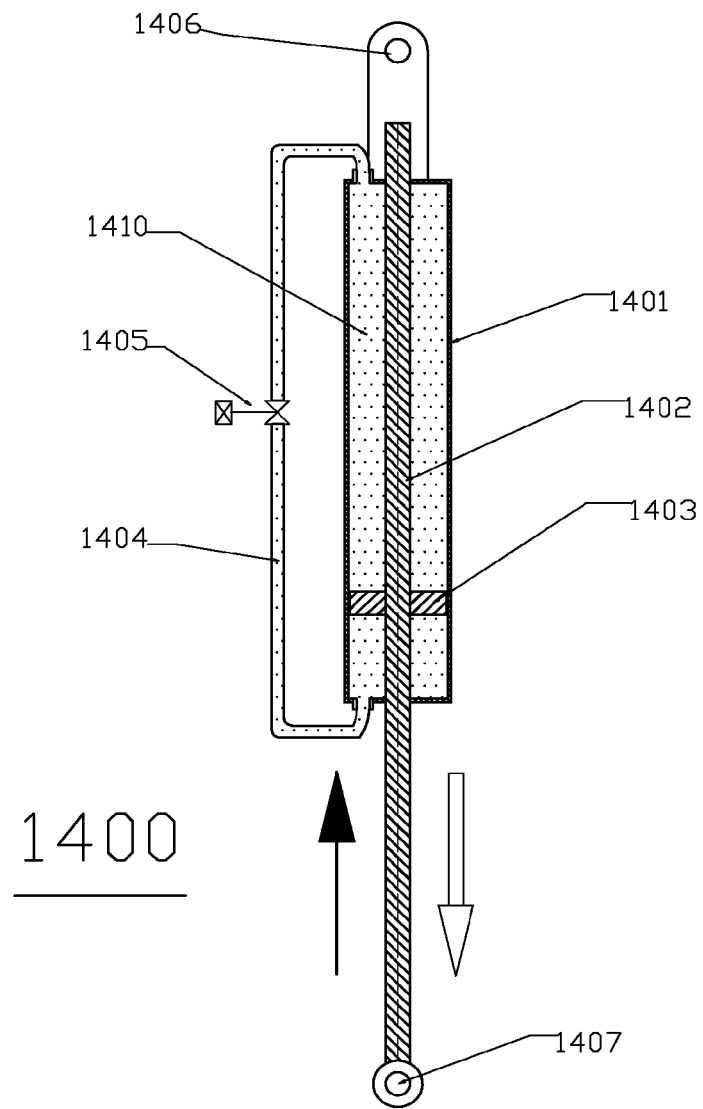
FIG. 14 is an enlarged view of a hydraulic axial clutch according to an embodiment of the present invention.

FIG. 14 is an enlarged view of a hydraulic axial clutch according to an embodiment of the present invention. In an example, the hydraulic axial clutch includes: a hydraulic cylinder 1401, a piston rod 1402, a piston 1403, a bypass pipe 1404, a bypass valve 1405, hydraulic oil 1410, mounting holes 1406 and 1407.

When the bypass valve 1405 is opened, the piston rod 1402 slides freely, which may provide a sliding connection to cut off an axial force. When the bypass valve 1405 is closed, the piston rod 1402 can not slide, which may provide a rigid connection to transmit the axial force.

In practical applications, the centrifugal force controlling axial clutch can be a mechanical axial clutch, or a hydraulic axial clutch, or an electromagnetic axial clutch, or other forms of axial clutches able to satisfy the following requirements. In general, the axial clutch may be used to transmit or cut off an axial force. When a centrifugal force controlling component is released, a shaft of the axial clutch slides axially within the bracket. At this time, the axial clutch may provide a slidable connection, and is in a state of not passing a force. When the centrifugal force controlling component is locked, the shaft of the axial clutch cannot slide within the bracket, and the axial clutch may play a role of a rigid connection to pass the force. That is, the axial clutch may be controlled by the centrifugal force controlling component.

Figure 15:
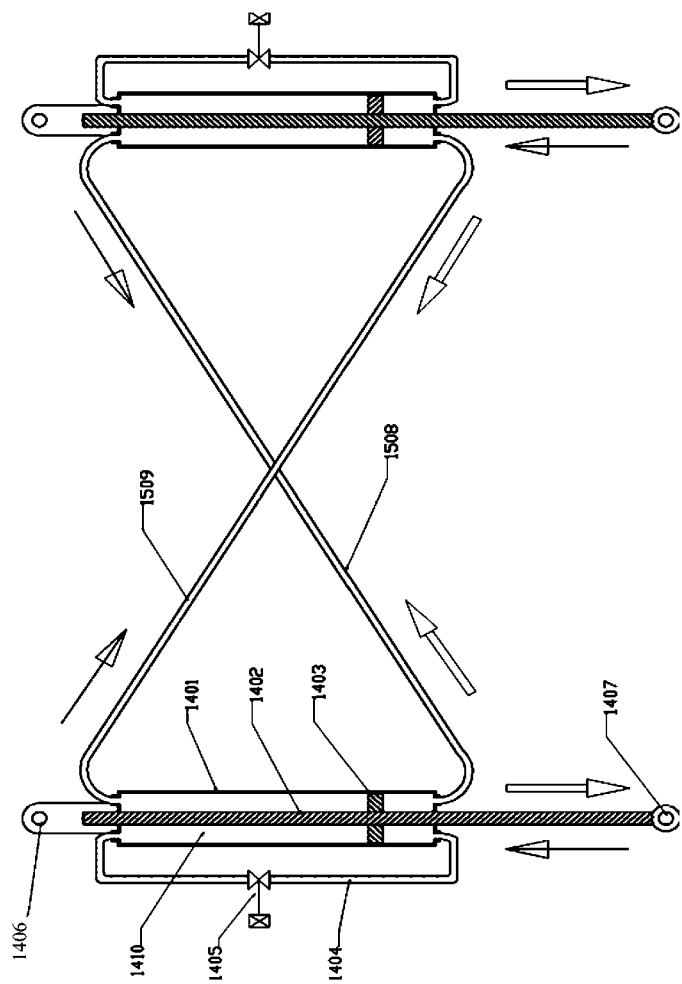
FIG. 15 is a schematic diagram illustrating a hydraulic skew force balancing apparatus including a centrifugal force controlling axial clutch, wherein connecting pipes replace a torsion balancing bar.

FIG. 15 is a schematic diagram illustrating a hydraulic skew force balancing apparatus according to an embodiment of the present invention. The hydraulic skew force balancing apparatus includes a pair of centrifugal force controlling axial clutches, and two connecting pipes for connecting the pair of centrifugal force controlling axial clutches. It can be seen that the connecting pipes are used to replace a traditional torsion balancing bar. A first mounting hole 1406 of the centrifugal force controlling axial clutch is hinged to the car body, and a second mounting hole 1407 is hinged to the wheel bracket. The wheels may hop freely when the vehicle runs straight by use of the centrifugal force controlling axial clutch under the control of the centrifugal force controlling component, which may enhance comfort of passengers. When the vehicle turns, the centrifugal force controlling axial clutch may balance the skew force, lower the car body, and improve safety and driving.

Specifically, the hydraulic skew force balancing apparatus may work as follows. When the centrifugal force controlling component detects that the vehicle runs straight, it may control the bypass valve 1405 to open, and hydraulic oils may flow through the bypass pipe 1404 and the connecting pipes 1508, 1509 accordingly. In this way, the piston rods 1402 on both sides may slide freely, and the wheels jump freely as well, which may enhance comfort. When the centrifugal force controlling component detects that the vehicle turns, it controls the bypass valve 1405 to close, the hydraulic oils 1410 may perform a two-way flow through the connecting pipes 1508, 1509, and the hydraulic cylinders 1401 on both sides. In an example, one end of a connecting pipe is connected to the lower end of a hydraulic cylinder at a first side, and the other end of the connecting pipe is connected to the upper end of another hydraulic cylinder at a second side. As such, a piston rod 1402 at a first side may push another piston rod at a second side to slide up when the piston rod 1402 rises and pull the another piston rod to slide down when the piston rod 1402 falls, and vice versa. That is, when the vehicle is turning right, the left side of the car body is dragged down by the centrifugal force to press the piston rod on the left side to rise. Then, the distance between the two mounting points 1406, 1407 of the left hydraulic axial clutch is shortened. The piston may drive the hydraulic oils to move along the connecting pipe 1509 according to the solid line arrow indicated in FIG. 15 to fill into the lower end of the right hydraulic cylinder, to jack up the piston rod on the right side. Meanwhile, the rise of the piston rod on the left side causes a negative pressure on the lower end of the left hydraulic cylinder, and the left hydraulic cylinder may suck the hydraulic oils from the upper end of the right hydraulic cylinder. The piston rod on the right side may be jacked up in the joint action of the two hydraulic cylinders, and the distance between the mounting points 1406, 1407 of the right hydraulic axial clutch is also shortened, thereby balancing the car body tilt and lowering the car body.

In one example, the centrifugal force controlling component may include: a sensor, a computer and a control execution unit. Specifically, the sensor is to detect a state or collect information regarding the vehicle. The detected data are provided to the computer for information processing. Finally, the control execution unit may control the centrifugal force controlling axial clutch or other components according to a processing result.

Figure 16:
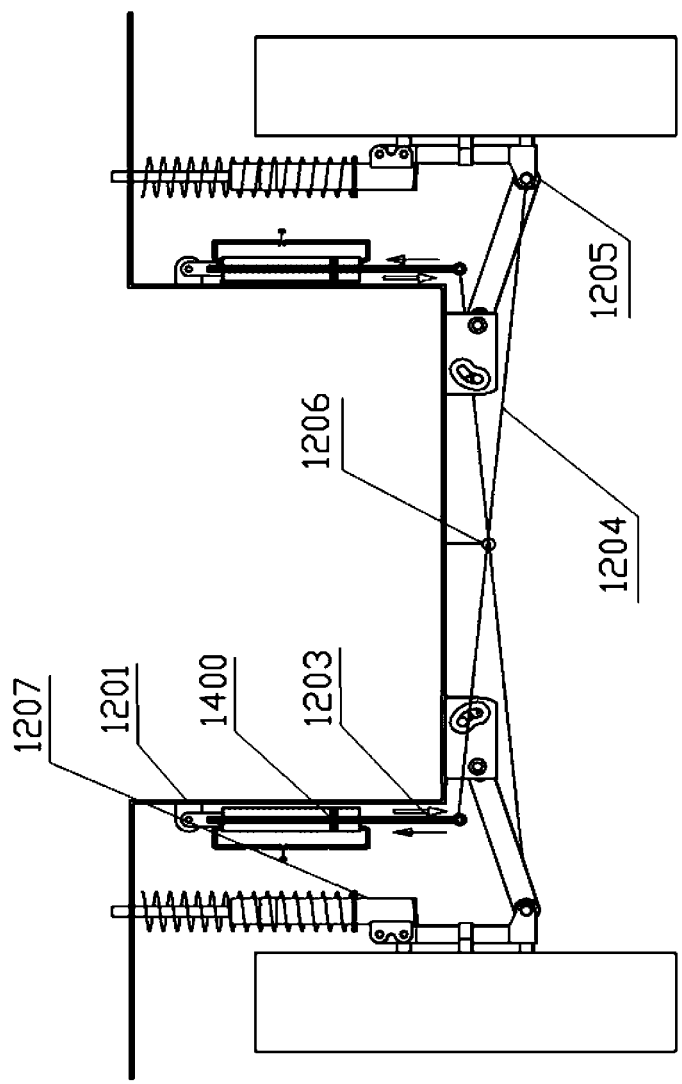
FIG. 16 illustrates a hydraulic axial clutch 1400 according to an embodiment of the present invention, which replaces a mechanical axial clutch 1202 illustrated in FIG. 12 and has the same principle as 1202.

FIG. 16 illustrates a hydraulic axial clutch 1400 applied in the vehicle according to an embodiment of the present invention. The hydraulic axial clutch 1400 in FIG. 16 replaces the mechanical axial clutch 1202 in FIG. 12, and has the same principle as the mechanical axial clutch 1202. Compared to the mechanical axial clutch 1202, the hydraulic axial clutch 1400 may be easier to control and operated smoothly, and it may also reduce costs.

According to the present invention, a combination may be achieved according to requirements so as to meet various needs of vehicles with different uses and different structural layouts.

In an example, beneficial effects of embodiments of the present invention may be listed below. Firstly, the wheels at two sides are totally independent with each other and there is no interference therebetween. Secondly, one bar is used instead of a plurality of bars to achieve a better motion than the plurality of bars, save the space and material, and reduce the weight and cost. Thirdly, the motion trace is always perpendicular to the car body and independent of the jumps of the wheels, thereby maximizing the contact area between the wheels and the road and enlarging the adhesion force on many road conditions. Moreover, the wheel track and wheelbase always keep constant (changes of the wheel track and wheelbase are compensated by the compensator 400, and the vertical projection distance of the left, right, front and rear wheels to the road may keep constant). In other words, the jumps of the wheels may not influence the stability of the car body. Since the wheels move linearly in a vertical direction, various parameters such as a kingpin inclination angle, wheel before beam and wheel camber keep the same as original setting parameters during various operations. That is, the wheels hop and the suspension parameters are independent with each other, such that it is feasible to make an optimal adjustment for the parameters. It is estimated that the original parameters may lose their meanings after using a floating suspension, i.e., it may not be necessary to adjust the original parameters. As such, it is possible to reduce a large amount of experiments, modification and adjustment, and designing, manufacturing, assembling and debugging may become simple and effective. Accordingly, there may be a large contact area between the wheels and the road, the power transmission is excellent, and the wheels sport a more reasonable attitude. Also, both the forward resistance and the tire wear are reduced, and the lifetime of the wheels is increased. Further, it may effectively decrease power consumption, save fuel, simplify the complex relationship between forces, and smooth the driving. Moreover, the driving, stability, safety and comfort capabilities of the whole vehicle may be enhanced significantly due to the anti-skew bar apparatus controlled by centrifugal force.

In addition, motion characteristics of the suspension system according to embodiments of the present invention may not be affected by the length of the apparatus, and the length of the apparatus may be large or small. The mounting direction may be freely selected within a plane perpendicular to the motion line to suit different installation spaces and increase layout flexibility. The suspension system described in embodiments of the present invention may also shorten the braking distance and enhance active safety. Additionally, the shock absorber 411, the spring 412 and other related components are in a linear motion state accordingly, so as to significantly increase lifetime.

The suspension system according to embodiments of the present invention is easy to manufacture with a low cost and is a substitute for a conventional suspension system. Furthermore, the suspension system according to embodiments of the present invention may have a broad range of stroke, a strong adaptability for the road, and establish an ideal suspension platform for incorporating an air suspension system or initiative suspension system. In addition, the combination of the floating swing arm 405 and the compensator 400 may provide linear motion characteristics applicable for other mechanical mechanisms.

According to embodiments of the present invention, one kind of suspension systems may be selected based on practical requirements, and a strengthened mounting base is preset at a corresponding location on the car body, of which the stress strength and movement space can meet the requirements for the suspension. At the same time, a mounting base for an anti-skew apparatus is preset, and the anti-skew apparatus may be directly mounted to the vehicle using a rubber sheath to absorb shocks. The suspension and the anti-skew apparatuses may not interfere with each other, and may be designed or use individually. In an example, the suspension placed longitudinally in pairs may have a positioning function itself without a locator. In an example, the suspension without longitudinal combination may be used together with a shock absorber. In an example, any kind of suspension may be combined with a subframe to form a front and rear suspension assembly so as to be suitable for mass production.

What is claimed is:

1. An independent suspension system with self-compensated floating swing arm, comprising:
   at least one of an independent suspension apparatus with self-compensated floating swing arm and a skew force balancing apparatus;
   wherein the independent suspension apparatus with self-compensated floating swing arm is to control wheels of a vehicle to perform linear motion constantly along a vertical direction of a car body of the vehicle; and
   wherein the skew force balancing apparatus is to balance skew force when the vehicle is cornering;
   wherein the independent suspension apparatus with self-compensated floating swing arm comprises: a compensator, a floating swing arm, a steering knuckle and a shock absorber;
   wherein the floating swing arm is connected with the compensator, and to perform a complex movement within a motion plane under the restriction of the compensator;
   wherein the floating swing arm includes: a front hole articulated to the steering knuckle and fixedly connected to the shock absorber via the steering knuckle; and
   wherein the compensator is to allow a central of a front hole to move vertically along an extension line of an axis of the shock absorber or along a line in parallel with the axis of the shock absorber;
   wherein the compensator comprises: a bracket connected to a mounting point of the car body; and
   wherein a middle slideway is arranged in one of the bracket of the compensator and the floating swing arm, and a limiting shaft within the middle slideway is arranged in the other one of the bracket of the compensator and the floating swing arm;
   wherein a limiting slideway is arranged in one of the bracket of the compensator and the floating swing arm, and a rear shaft within the limiting slideway is arranged in the other one of the bracket of the compensator and the floating swing arm;
   wherein the central of the front hole, an axis of the rear shaft and an axis of the limiting shaft are on the same line.

2. The system according to claim 1, wherein the limiting shaft or the rear shaft is provided with a bushing or bearing, and is lubricated and sealed.

3. The system according to claim 1, wherein a central line of the limiting slideway is a compensation curve for controlling deviation of a motion line of the central of the front hole in cooperation with the middle slideway.

4. The system according to claim 1, wherein the shock absorber, the compensator, the floating swing arm, and the steering knuckle are mounted perpendicular to the car body, or the shock absorber is mounted on the car body with a little incline relative to the front or rear direction of the car body at the same angle as the compensator, the floating swing arm and the steering knuckle; and
   wherein the shock absorber is bolted with the steering knuckle at the lower end of the shock absorber.

5. The system according to claim 1, wherein the independent suspension apparatus with self-compensated floating swing arm comprises: a compensator, a floating swing arm, a steering knuckle and a shock absorber;
   wherein the floating swing arm is articulated to the steering knuckle, and is fixedly connected to the shock absorber via the steering knuckle; and
   wherein the floating swing arm is connected to the compensator, and the compensator is to limit degree of freedom of the floating swing arm and provide compensation for motion deviation.

6. The system according to claim 1, wherein the independent suspension apparatus with self-compensated floating swing arm comprises two sets of the compensators and the floating swing arms connected with a wheel; and
   wherein the two sets of the compensators and the floating swing arms have an angle of 90 degrees with each other, or are mounted in a random direction within a plane perpendicular to the car body; or
   wherein the independent suspension apparatus with self-compensated floating swing arm comprises a set of the compensator and the floating swing arm installed in a shape of letter A.

7. The system according to claim 1, wherein the skew force balancing apparatus is a scissors-type anti-skew bar apparatus controlled by centrifugal force;
   wherein the scissors-type anti-skew bar apparatus controlled by centrifugal force is to balance the skew force via changing the direction and bearing point of the force, and to balance the skew force automatically under the control of the centrifugal force when the vehicle is cornering; and wherein the scissors-type anti-skew bar apparatus controlled by centrifugal force comprises: a centrifugal force controlling axial clutch, a connecting rod and a lever, and the centrifugal force controlling axial clutch is to transmit or cut an axial force.

8. The system according to claim 7, wherein the scissors-type anti-skew bar apparatus controlled by centrifugal force further comprises: a centrifugal force controlling component;

when the centrifugal force controlling component is released, a shaft of the centrifugal force controlling axial clutch is to slide axially within the bracket, thereby cutting off the axial force; and when the centrifugal force controlling component is locked, the shaft of the centrifugal force controlling axial clutch is incapable of sliding axially within the bracket, and the centrifugal force controlling axial clutch is to play a role of rigid connection for transmitting the axial force.

9. The system according to claim 8, wherein the centrifugal force controlling axial clutch comprises: a mechanical axial clutch, or a hydraulic axial clutch, or an electromagnetic axial clutch.

10. The system according to claim 1, wherein the independent suspension system with self-compensated floating swing arm comprises a pair of the scissors-type anti-skew bar apparatuses controlled by centrifugal force arranged on at least one pair of wheel brackets of front wheels and rear wheels;

wherein the pair of the scissors-type anti-skew bar apparatuses controlled by centrifugal force are crossed and disposed symmetrically in a scissors-type form; and the two levers of the pair of the scissors-type anti-skew bar apparatuses controlled by centrifugal force are crossed to form two opposite angles having the crossing point as a vertex.

11. The system according to claim 1, wherein the skew force balancing apparatus comprises: a hydraulic skew force balancing apparatus;

wherein the hydraulic skew force balancing apparatus comprises: a first centrifugal force controlling axial clutch, a second centrifugal force controlling axial clutch, a centrifugal force controlling component, and two connecting pipes for connecting the first and second centrifugal force controlling axial clutches;

wherein the centrifugal force controlling axial clutch comprises: a bypass valve, a bypass pipe, a piston rod, a hydraulic cylinder, a first mounting hole articulated to the car body, and a second mounting hole articulated to the wheel bracket;

one of the two connecting pipes is connected at one and to the lower end of the hydraulic cylinder in the first centrifugal force controlling axial clutch, and is connected at the other end to the upper end of the hydraulic cylinder of the second centrifugal force controlling axial clutch;

when the centrifugal force control component detects that the vehicle goes straight, the bypass valve is open to enable hydraulic oils flow through the bypass pipe and the connecting pipes, and pull the piston rods in both the first and second centrifugal force controlling axial clutch to slide freely; and when the centrifugal force controlling component detects the vehicle is cornering, the bypass valve is closed, the hydraulic oils flow through the connecting pipes and the hydraulic cylinders, the piston rods rise at the same time, and the distance between the first mounting point and the second mounting point of the first centrifugal force controlling axial clutch and that of the second centrifugal force controlling axial clutch are shortened in synchronization, so as to balance the car body tilt and lower the car body.

12. A linear motion mechanism, comprising: a compensator and a floating swing arm;

the compensator comprises: a bracket connected to a mounting point of a mechanical device which requires linear motion; and wherein a middle slideway is arranged in one of the bracket of the compensator and the floating swing arm, and a limiting shaft within the middle slideway is arranged in the other one of the bracket of the compensator and the floating swing arm;

wherein a limiting slideway is arranged in one of the bracket of the compensator and the floating swing arm, and a rear shaft within the limiting slideway is arranged in the other one of the bracket of the compensator and the floating swing arm;

wherein the floating swing arm comprises a front hole; and a central of the front hole, an axis of the rear shaft and an axis of the limiting shaft are on the same line.

13. The mechanism according to claim 12, wherein a central line of the limiting slideway is a compensation curve for controlling deviation of a motion line of the central of the front hole in cooperation with the middle slideway;

wherein the middle slideway is to limit degree of freedom in a vertical direction of the floating swing arm, and the limiting slideway is to limit degree of freedom in a horizontal direction.

14. The mechanism according to claim 12, wherein the limiting shaft or the rear shaft is provided with a bushing or bearing, and is lubricated and sealed.

15. An independent suspension system with self-compensated floating swing arm, comprising:

at least one of an independent suspension apparatus with self-compensated floating swing arm and a skew force balancing apparatus;

wherein the independent suspension apparatus with self-compensated floating swing arm is to control wheels of a vehicle to perform linear motion constantly along vertical direction of a car body of the vehicle; and wherein the skew force balancing apparatus is to balance skew force when the vehicle is cornering;

wherein the independent suspension apparatus with self-compensated floating swing arm comprises: a compensator, a floating swing arm, a steering knuckle and a shock absorber;

wherein the floating swing arm is connected with the compensator, and to perform a complex movement within a motion plane under the restriction of the compensator;

wherein the floating swing arm includes: a front hole articulated to the steering knuckle and fixedly connected to the shock absorber via the steering knuckle; and wherein the compensator is to allow a central of the front hole to move vertically along an extension line of an axis of the shock absorber or along a line in parallel with the axis of the shock absorber;

wherein the compensator comprises a bracket connected to a mounting point of the car body;

wherein a middle slideway is arranged in one of the bracket of the compensator and the floating swing arm, and a limiting shaft within the middle slideway is arranged in the other one of the bracket of the compensator and the floating swing arm;

wherein the bracket of the compensator comprises: a positioning shaft, a positioning hole, a crank, and a rear shaft;

wherein one end of the crank is articulated to the floating swing arm via the rear shaft, and the other end of the crank is articulated to the bracket of the compensator passing the positioning hole via the positioning shaft, in order to form a crank eccentric mechanism including the floating swing arm, the bracket of the compensator and the crank.

* * * * *